C. E. AYERS.
TROWEL.
APPLICATION FILED MAY 4, 1915.
1,164,161.
Patented Dec. 14, 1915.
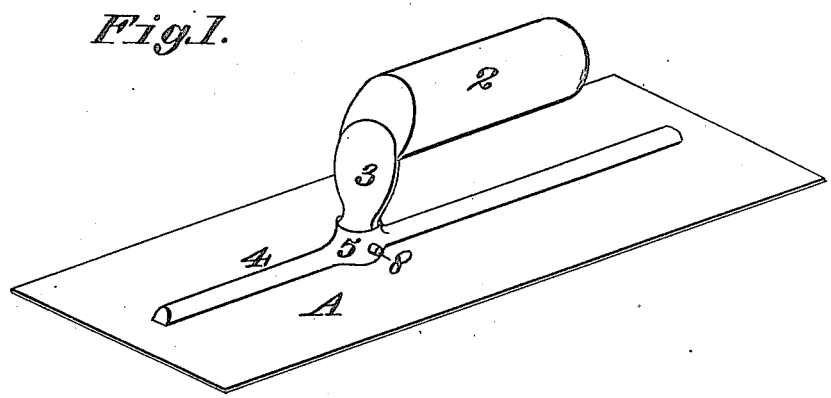
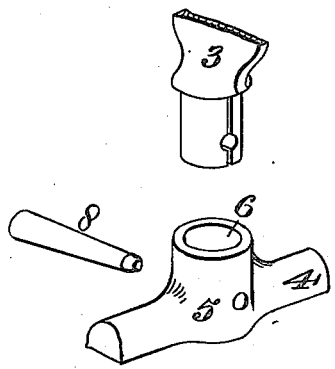
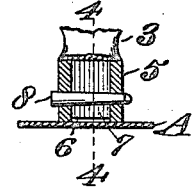
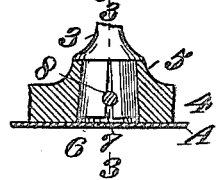
WITNESSES:
Charles Pickles
Thos Eastberg
INVENTOR
Clifford E. Ayers
BY G. H. Strong.
ATTORNEY

UNITED STATES PATENT OFFICE.

CLIFFORD E. AYERS, OF SAN FRANCISCO, CALIFORNIA.

TROWEL.

1,164,161. Specification of Letters Patent. Patented Dec. 14, 1915.

Application filed May 4, 1915. Serial No. 25,701.

*To all whom it may concern:*

Be it known that I, CLIFFORD E. AYERS, a citizen of the United States, residing at the city and county of San Francisco and State of California, have invented new and useful Improvements in Trowels, of which the following is a specification.

My invention relates to improvements in trowels and like implements.

It consists of a trowel blade with a longitudinal strengthening rib along the back having a vertical tapering socket formed in it, a handle with a connecting stem having a split, tapered end adapted to fit the socket, and a transverse tapered key adapted to pass through the split end to spread and lock in the socket.

It also comprises details of construction which will be more fully explained by reference to the accompanying drawings, in which—

Figure 1 is a view of the trowel and handle. Fig. 2 is a section showing the socket, stem and expanding locking means. Fig. 3 is a section on line 3—3 of Fig. 4. Fig. 4 is a section on line 4—4 of Fig. 3.

As shown in the drawings, A is a thin, flat metal plate which forms the working part of the trowel and 2 is a handle grip supported at a convenient distance along and parallel with the back of the plate by a shank 3, one end of which may extend longitudinally through the handle and be secured by a nut threaded upon the protruding end. The plate A is stiffened by a raised rib 4 extending longitudinally along the center of the back. At a convenient point in this rib is an enlargement or boss 5, so located that, when the handle is connected with it, the blade A will be in proper relation and balance for work.

A socket 6 is made vertically in the boss 5 with slightly tapering or convergent sides and a closed bottom. The lower end of the shank 3 is similarly tapered to fit snugly in the socket 6. This end is split transversely, as shown, and a transverse tapering pinhole is made through opposite sides of the boss 5 and also in alinement through the split portion of the shank, as at 7.

8 is a tapering pin fitted to the holes in the boss 5 and in the split stem, and when the shank of the handle has been introduced into the socket 6, the pin 8 may be driven through the registering holes so as to spread the split in the shank end, so as to lock the shank very solidly to the working part of the trowel and in a manner to prevent its working loose.

In this construction no ears or extensions from the shank are necessary or any vertical holes through the bottom of the plate to roughen up the finished work.

Having thus described my invention, what I claim and desire to secure by Letters Patent is—

In combination with a trowel or the like, a boss connected thereto and having a socket the walls of which converge outwardly, a handle having a shank tapered to fit the socket, said shank being split to form a pair of prongs and having an aperture formed transversely in part through each prong on the inner face of the latter, said aperture being located between the ends of the shank, said boss having a similar aperture adapted for registry with the shank aperture, and combined means for positively interlocking the inner face of each prong to the boss and for simultaneously spreading the prongs to cause the same to have their outer faces interlocked with the boss composed of a single and tapering pin received in said registering apertures.

In testimony whereof I have hereunto set my hand in the presence of two subscribing witnesses.

CLIFFORD E. AYERS.

Witnesses:
CHARLES E. REITH,
A. W. WISE.